United States Patent [19]

Graton et al.

[11] Patent Number: 5,137,133
[45] Date of Patent: Aug. 11, 1992

[54] LOW INERTIA FRICTION CLUTCH, ESPECIALLY FOR AN AUTOMOTIVE VEHICLE

[75] Inventors: Michel Graton, Paris; Fabrice Tauvron, Creteil, both of France

[73] Assignee: Valeo, Paris, France

[21] Appl. No.: 658,508

[22] Filed: Feb. 21, 1991

[30] Foreign Application Priority Data

Feb. 27, 1990 [FR] France .................. 90 02433

[51] Int. Cl.5 .................. F16D 13/64; F16D 69/04
[52] U.S. Cl. .................. 192/107 C; 192/52; 192/113 A
[58] Field of Search .......... 192/52, 70.12, 106.1, 192/107 R, 107 C, 113 A

[56] References Cited

U.S. PATENT DOCUMENTS

| | | | |
|---|---|---|---|
| 1,862,991 | 6/1932 | Vargha | 192/106.1 |
| 2,253,316 | 8/1941 | Armitage | 192/107 R |
| 3,064,782 | 11/1962 | Du Bois | 192/107 C |
| 4,529,079 | 7/1985 | Albertson | 192/107 C |
| 4,821,860 | 4/1989 | Crawford et al. | 192/107 C |

FOREIGN PATENT DOCUMENTS

| | | |
|---|---|---|
| 0252583 | 1/1988 | European Pat. Off. |
| 2255499 | 7/1975 | France |
| 2600732 | 12/1987 | France |
| 8912466 | 9/1989 | France |

*Primary Examiner*—Richard Lorence
*Attorney, Agent, or Firm*—Longacre & White

[57] ABSTRACT

This invention relates to a friction clutch member of the kind having two friction pads which are fixed on annular support members which lie facing each other in the axial direction. A resilient progressive engagement member is interposed between the two friction pads, and includes a plurality of projecting bosses of resilient material, each boss being hollow in the middle and delimited at least over a major part of its periphery by a band of resilient material. The invention is especially applicable to automotive vehicles.

12 Claims, 1 Drawing Sheet

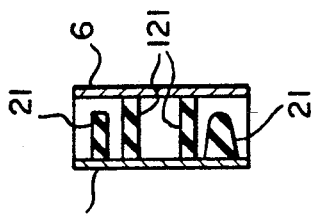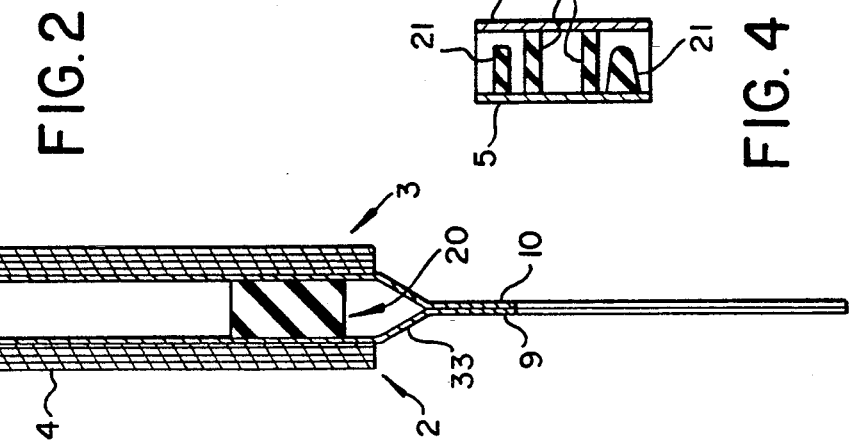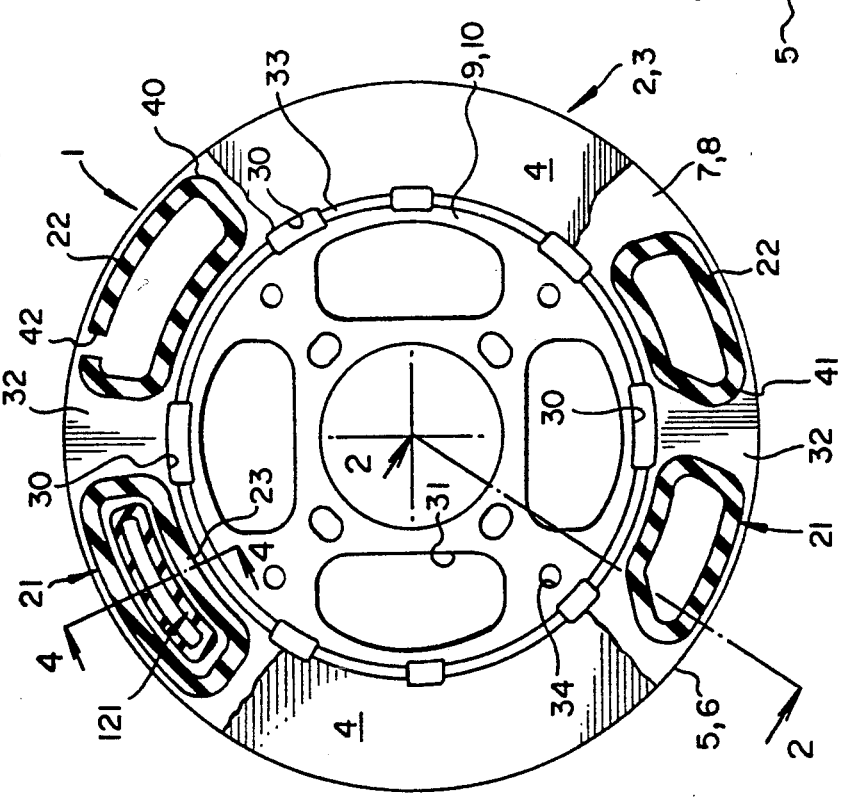

LOW INERTIA FRICTION CLUTCH, ESPECIALLY FOR AN AUTOMOTIVE VEHICLE

FIELD OF THE INVENTION

This invention relates to a friction clutch, in particular for an automotive vehicle, of the kind comprising two coaxial friction pads which are spaced axially from each other and which are secured on to annular support members which face each other in the axial direction and which includes radial extensions, directed inwardly by means of at least one bent portion formed on at least one of the inward radial projections, whereby they are brought together in the axial direction so as to lie back to back, radially inward of the friction pads.

BACKGROUND OF THE INVENTION

Such a friction clutch is described in the French patent application filed on Sep. 22, 1989 under the Application No. 89 12466 and published as document no. 2652397. Its friction pads are arranged to be gripped between the pressure plate and the reaction plate of the clutch, while the support members are arranged to be fixed to a driven shaft of the clutch for rotation therewith (this driven shaft being usually the input shaft of the gearbox).

In the latter, an engagement element for giving progressive engagement, which is interposed between the two friction pads comprises a plurality of projections of resilient material, at least some of which connect the two support members together, with the said projections defining channels between them. This arrangement affords good ventilation to the projections, while the friction member or clutch plate of the clutch, comprising the support members with the friction pads and resilient engagement member, has a good progressive engagement action. Under load, it adapts well to thermal deformations of the pressure and reaction plates, so that the friction pads undergo even wear. In addition, the inertia of the friction member is not unduly increased.

The support members have a thickness which is relatively low, and contribute to the progressive engagement action of the friction member of the clutch, while enabling the friction pads to be fitted without the need to have recourse to fastening rivets. This enables the low inertia of the friction clutch to be preserved.

However, the projections referred to above consist of thin bands of material, so that it can be desirable to improve their mechanical strength, especially when the clutch is rotating at high speed so that centrifugal force is increased.

DISCUSSION OF THE INVENTION

An object of the present invention is to increase the mechanical strength of the projections without losing the advantages of the arrangement described above.

In accordance with the invention, a friction clutch of the kind described above is characterised in that the said projections are in the form of projecting bosses which are hollow in the middle, and which are delimited at least over a major part thereof by a band of resilient material.

The invention enables the mechanical strength of the projections to be increased while giving them good ventilation, and affording a good progressive engagement action due to their hollow shape. In addition, the moment of inertia of the friction clutch is not unduly increased. Of course, it would have been possible to adapt an arrangement such as that described in European published patent specification No. EP 0 252 583A. In that document, the friction pads are directly carried by resilient projections which are connected to the support member itself (as in U.S. Pat. No. 4,529,079), and the zone of contact between the said projections and the support member is reduced due to the fact that the projections are associated with support fingers extending alternately in one axial direction and in the other axial direction. The result of this is poor resistance to centrifugal force.

In the present invention, there are two support members, which, at their outer periphery, are free of support fingers extending in the two opposite axial directions, so that the friction pads are well maintained in position, with the zone of contact between the projections and the support member or members being large. The projections are in the form of bosses. The friction clutch in accordance with the invention thus has high resistance to centrifugal force and is able to rotate at high speed, while displaying good progressive engagement action during the gripping of the friction pads between the pressure plate and reaction plate of the clutch. It is also well ventilated.

In addition, it is possible to increase the circumferential width of the ventilation channels.

It will be appreciated that the presence of the band of resilient material mentioned above enables a wide choice to be available in the number of shapes in which the projections can be formed. Thus they can be made in the form of (for example) loops of different shapes. It will also be appreciated that it is easily possible to achieve variable progressive engagement, for example by varying the height of the band of resilient material, or by locating one boss, of increased height, within another boss or vice versa.

These bosses may be completely closed by their surrounding bands of resilient material; alternatively, they may beneficially be formed with passages interrupting these bands, for evacuating air during compression of the friction pads.

The following description of a preferred embodiment of the invention illustrates the invention, but by way of example only, with reference to the accompanying drawings.

BRIEF DESCRIPTION OF THE DRAWINGS

FIG. 1 is a partial front view of a friction clutch in accordance with the invention, with certain parts shown locally cut away in the upper and lower parts of the Figure.

FIG. 2 is a view in cross section taken on the line 2—2 in FIG. 1.

FIG. 3 is a partial view similar to FIG. 2, but with the friction material omitted.

FIG. 4 is a view in cross section taken along line 4—4 in FIG. 1.

DESCRIPTION OF A PREFERRED EMBODIMENT OF THE INVENTION

Referring to the drawings, these show a friction clutch 1, in particular for an automotive vehicle. It comprises two annular and coaxial friction pads 2 and 3, which are arranged to be rotatable together and which are secured to a carrier plate (not shown). This carrier plate is coupled to a hub (again not shown), for rotation therewith, the hub being carried on a driven shaft of the clutch for rotation with it, and being secured to it, for example by riveting. The pads 2 and 3 are adapted to be gripped between the pressure plate and reaction plate of the clutch, these being fixed with respect to a driving shaft for rotation with the latter, so that the friction pads transmit movement from the driving shaft to the driven shaft. The friction material 4 of each pad 2, 3 is directly moulded or adhesively bonded, for example by use of an adhesive, on to a respective annular support member 5, 6. The two support members 5 and 6 respective faces lie coaxially in facing relationship in the axial direction, and in this example they are of metal and of low thickness. The friction material 4 is for example of an asbestos based material, including glass fibre or carbon fibre or fibre of metal-ceramic material.

Each support member 5, 6 includes a flat ring 7, 8, from which a radial extension 9, 10 respectively projects inwardly. The rings 7 and 8 are parallel to each other and spaced axially apart, and offer a large engagement surface for the pads 2 and 3. The radial projections 9 and 10 have circumferential bent portions 33 joining the rings 7 and 8 to central or inner radial portions which lie together and can be secured together, with these inner radial portions being parallel to each other and also parallel to the rings 7 and 8.

It will be noted that the bent portions 33 of the supports 5 and 6 are oblique, and that they improve the axial elasticity of the latter. It will also be noted that the friction pads 2 and 3 are spaced axially away from each other because of the configuration of their support members 5 and 6, defining between them a precisely defined axial space. The extension portions 9 and 10 are pierced, with holes indicated at 34 in FIG. 1, and are secured to a guide ring (not shown) by means of the spacers which join the two guide rings together. For further detail, reference is invited for example to FIG. 4 of French published patent application FR 2 600 732A.

The friction clutch also includes a resilient progressive engagement element 20 acting as a spring and interposed between the two friction pads 2 and 3. The resilient element 20 comprises a plurality of projections 21 of resilient material, at least some of which are fixed to the supports 5 and 6, these projections 21 defining channels 32 between them. In this example, all of the projections 21 are fixed at the same time to the supports 5 and 6. The supports 5 and 6 are thus connected together through the projections 21, and the latter are moulded to the latter or adhesively secured to them.

The projections 21 are in the form of projecting bosses 21, hollow in the centre and each delimited, at least over a major part, by a band 40 of resilient material. These bosses may take any appropriate shape. They are preferably spaced apart regularly around the circle and are preferably in the form of a loop which extends radially and circumferentially. For example, and as shown in FIG. 1, they may be oblong in shape and have the general shape of a trapezium, as shown in the top part of FIG. 1.

Preferably, these trapezoidal bosses 21 are formed with a surface 22 at their outer periphery, which is of greater circumferential extent than the surface 23 formed at their inner periphery. However, the opposite is of course possible. In this example they extend in a generally radial direction over the whole height of the flat rings 7 and 8, that is to say generally over the whole radial length of the friction pads 4 (FIG. 2). In this example the shape of both the outer surface 22 and the inner surface 23 is that of an arc of a circle.

This arrangement gives the friction clutch a radial stiffness which is substantially constant from the outer periphery to the inner periphery of the friction pads, so that under load, i.e. when the pads 2 and 3 are gripped between the pressure plate and reaction plate of the clutch, good distribution of pressure can be obtained. In addition, the pads 2 and 3 are able correctly to follow the profile of the pressure plate and of the reaction plate of the clutch, even when the latter is hot. The bosses 21 can be fully closed by the band 40, or, in a modification, they may be open via at least one passage 42 which facilitates the evacuation of air during compression of the friction pads.

It is also possible to make the bosses 21 asymmetrical, as for example is illusrated in the lower part of FIG. 1. Thus, for example one of the lateral sides of the boss may be more inclined than the other as indicated by the reference numeral 41 in FIG. 1, in such a way as to afford good ventilation between two consecutive bosses since the boss is then in the form of a ventilating fin. To this end each boss is formed with a somewhat pointed end. This shape leads to an increase in the length of the outer surface 22 as compared with that of the inner surface 23. The resulting stiffness is even more nearly constant from the inner periphery to the outer periphery.

Openings 30 are defined radially inwardly of the inner surfaces 23, and are formed in the continuous bent portions 33 of the annular support members 5 and 6. These openings 30 extend over the major part of the circumference between two adjacent bosses 21, and lie radially in line with the channels 32.

The resilient material of which the projections 21 are made is preferably of low density, and may for example consist of silicone based rubber which is highly resistant to temperature.

The band 40 of material is readily deposited using a nozzle, and is preferably formed from an adhesive silicone paste which cures after being applied. The adhesive materials described in U.S. Pat. No. 4,529,079 may for example be used. The projections 21 are then adhesively secured on to the support members 5 and 6, on the side opposite to the friction material 4. In a modification, it is possible to secure the bosses 21 adhesively by vulcanisation, or alternatively to secure them by swaging or clipping. In the two latter cases, the support members 5 and 6 are locally formed with corresponding integral bosses to effect the swaging or clipping action.

It is thus possible to assemble the support members 5 and 6 and the resilient element 20 into a sub-assembly which is readily capable of being handled and transported, with the friction material 4 being subsequently fixed on to the outer faces of this sub-assembly.

In another modification it is possible to partly fabricate the friction pads 2 and 3 with their associated support members 5 and 6, and then to join the two sub-assemblies together by means of the resilient element 20, with the openings 30 subsequently allowing the assembly to be ventilated, particularly when the bent portions 33 are continuous. However, in this example, the central portions of the support members 5 and 6, within the bent portions 33, are in the form of discs, and are provided with windows 31 of oblong shape to accommodate the springs which are conventionally provided in the friction clutch.

It will be noted that the friction pads 2 and 3, with their support members 5 and 6 are identical to each other, and that the projections 21 overlap, with the windows 31 facing each other, as do the openings 30.

The band 40 of resilient material may have a thickness which is reduced progressively in the axial direction from one of the support members 5, 6 to the other. This is made possible in particular by using a nozzle of an appropriate shape.

As will be understood from the foregoing, the bosses 21 together define the channels 32 which are open at both ends. Good ventilation, enhanced by the openings 30, is thus obtained and the bosses 21 are able to deform, especially in the circumferential direction.

Good axial engagement is obtained during engagement of the clutch when the friction pads 2 and 3 are brought closer to each other by being gripped progressively between the pressure plate and the reaction plate of the clutch. During the declutching operation, the friction pads 2 and 3 are freed, and the resilient element 20 limits their axial spacing so that the friction pads 2 and 3 are in no danger of grazing the pressure plate or the reaction plate or both.

As will be clear from the foregoing description and from the drawings, the shape, number and dimensions of the bosses 21 will be determined in accordance with the particular applications, each boss being for example cylindrical or, in another modification, having the form of a diabolo (opposed double conic shape, resembling the shape of a butterfly) and being discontinuous. In a clutch having the bosses 21 shown in the upper part of FIG. 1, there are six bosses, whereas if the bosses are as is shown in the lower part of FIG. 1, there will be eight.

The present invention is of course not limited to the various embodiments described above. In particular, the inner periphery of the support members may be in the form of a set of tongues in the manner described in the above mentioned French patent application No. FR 2 600 732A. Similarly, the bosses 21 may be inclined in the circumferential direction, having for example the shape of a parallelogram to define ventilating fins.

It will also be clear from the above description that in the example given, all of the bosses 21 are fixed with respect to at least one of the support members 5 and 6. However, some of them may be fixed to only one of the support members, so as to produce variable engagement of the clutch, with a free space then existing between these bosses 21 and the support member to which they are not fixed (see FIG. 4).

It follows that some of the bosses 21 may be of different heights from others.

It is also possible to locate one boss, having a different height, inside the other as is indicated at 121 in FIG. 1. The band 221 shown in FIG. 3 may be joined to the two support members 5 and 6 and also have projecting elements 222 alternating with depressions 223. This is readily made possible for example by depositing several layers of material to form one boss.

The friction pads 2 and 3 may of course be segmented instead of being annular in shape. The same is true of the radial projections 9 and 10.

The support members may constitute the damper plate of the friction clutch, in the manner that is shown in FIG. 7 of the above mentioned French published patent specification No. FR 2 600 732. Again, the support members may be fixed to one of the guide rings of the friction clutch, by means of rivets as shown in FIG. 1 of the French patent specification mentioned above.

The support members may be made so that they are not identical with each other, one being flat while the other has an oblique bent portion so as to bring the two support elements together at their inner periphery. However, instead of being oblique as in FIGS. 1 and 2, the bent portions 33 may be arranged concertina-fashion or in any other suitable way.

Finally the openings 30 may be spaced apart regularly by alternating from one disc to the other, or they may be spaced apart in any other way. One of the support members may have more openings than the other, or may even carry all of these openings.

What is claimed is:

1. A friction clutch member, for gripping between a pressure plate and reaction plate of a clutch to couple the pressure and reaction plates with a driven shaft, the clutch member comprising a pair of annular support members, each of which comprises a first portion, a second portion forming an inward radial extension of the first portion, and at least one bent portion formed in at least one of said second portions, whereby the two support members are mounted with their second portions in an axial juxtaposition for securing them to a said driven shaft for rotation therewith, two coaxial friction pads spaced axially apart from each other and adhesively bonded or molded onto said first portion of said support members, and the clutch member further comprising a resilient engagement member interposed between the two friction pads and fixed to at least one of the said support members, the said resilient engagement member comprising a plurality of axial projections of resilient material, with at least some of the said projections connecting said support members together, the said projections defining channels between them and being in the form of projecting bosses, centrally hollow, each of said projecting bosses defined at least in a major part thereof by a band of resilient material, wherein said bosses are spaced apart around and along said respective annular support members and are generally in the form of a loop which extends both radially and circumferentially.

2. A clutch according to claim 1, wherein the said bosses are oblong in shape.

3. A clutch according to claim 2, wherein the said bosses define at their radially outer periphery and their radially inner periphery an external surface and an internal surface respectively, the external surface being of greater circumferential extent than the internal surface.

4. A clutch according to claim 1, wherein the said bosses are of generally trapezoidal shape, and define a radially outer surface and a radially inner surface, with the said surfaces being in the form of arcs of circles.

5. A clutch according to claim 4, wherein each boss has two lateral sides, one of which is more inclined than the other to the radial direction whereby the boss forms a ventilating fin.

6. A clutch according to claim 1, wherein the said bands have a thickness which reduces progressively in the axial direction from one of the said support members to the other.

7. A clutch according to claim 1, wherein the said band is formed with projecting elements.

8. A clutch according to claim 1, wherein some of the said projections are fixed to only one of the said support members, and define a space between themselves and the other of the said support members.

9. A clutch according to claim 8, wherein the said bosses are of different heights.

10. A clutch according to claim 9, wherein one said boss is located within another said boss of different height.

11. A clutch according to claim 1, wherein at least one of the radial projections of the said support members has an oblique bent portion extending towards the radial extension of the other support member so as to meet the latter along the inner radial portion, openings being formed in the said bent portions in line with the said projections.

12. A clutch according to claim 1, wherein the said bands of the said bosses define at least one passage.

* * * * *